Sept. 2, 1924.

V. M. WEAVER 1,506,873

APPARATUS FOR PRODUCING AND SEPARATING CERTAIN SUBSTANCES

Original Filed July 6, 1915    3 Sheets-Sheet 1

Inventor
Victor M. Weaver
By Brown, Hanson & Boettcher
Attys

Sept. 2, 1924.

V. M. WEAVER 1,506,873

APPARATUS FOR PRODUCING AND SEPARATING CERTAIN SUBSTANCES

Original Filed July 6, 1915    3 Sheets-Sheet 3

Inventor
Victor M. Weaver

By Brown, Hanson & Boettcher
Attorneys.

Patented Sept. 2, 1924.

1,506,873

UNITED STATES PATENT OFFICE.

VICTOR M. WEAVER, OF HARRISBURG, PENNSYLVANIA, ASSIGNOR TO WEAVER COMPANY, A CORPORATION OF WISCONSIN.

APPARATUS FOR PRODUCING AND SEPARATING CERTAIN SUBSTANCES.

Original application filed January 7, 1915, Serial No. 919. Divided and this application filed July 6, 1915, Serial No. 38,386. Renewed November 21, 1919. Serial No. 339,680.

*To all whom it may concern:*

Be it known that I, VICTOR M. WEAVER, a citizen of the United States, residing at Harrisburg, in the county of Dauphin and State of Pennsylvania, have invented a certain new and useful Improvement in Apparatus for Producing and Separating Certain Substances, of which the following is a full, clear, concise, and exact description, reference being had to the accompanying drawings, forming a part of this specification.

My invention relates to apparatus for carrying out processes of forming, treating and separating chemical compounds or elements depending upon certain chemical or physical characteristics, or both.

The apparatus of my invention provides means—

1. For the separation of two or more substances which condense at different temperatures.

2. For the production of deliquescent substances.

3. For the treatment of substances under the influence of heat, and

4. More specifically, for the production and separation of aluminum chloride and silicon tetrachloride.

It will be clear to those skilled in the art that my invention will admit of broader application than the specific uses which I shall describe as an instance of its employment. In order to simplify this description I shall describe my apparatus as employed in carrying out a process of securing aluminum chloride and silicon tetrachloride from clay and proper reagents and separating these two chlorides. In the treatment of clay I break up the compound in the presence of carbon by the use of chlorine gas so as to produce aluminum chloride, silicon tetrachloride and carbon monoxide and then subject the chlorides which I thus form to condensing temperatures whereby the two chlorides are separated and independently collected.

This application is division of my copending application, Serial No. 919, filed January 7, 1915, which resulted in my patent 1,300,205 dated April 8, 1919, which in turn is division of the application Serial No. 858,001, filed August 22, 1914, which resulted in my Patent No. 1,238,604, dated August 28, 1917.

My invention will be more readily understood by reference to the accompanying drawings, in which, Figure 1 is a more or less diagrammatic representation of the system of apparatus;

Figure 1:
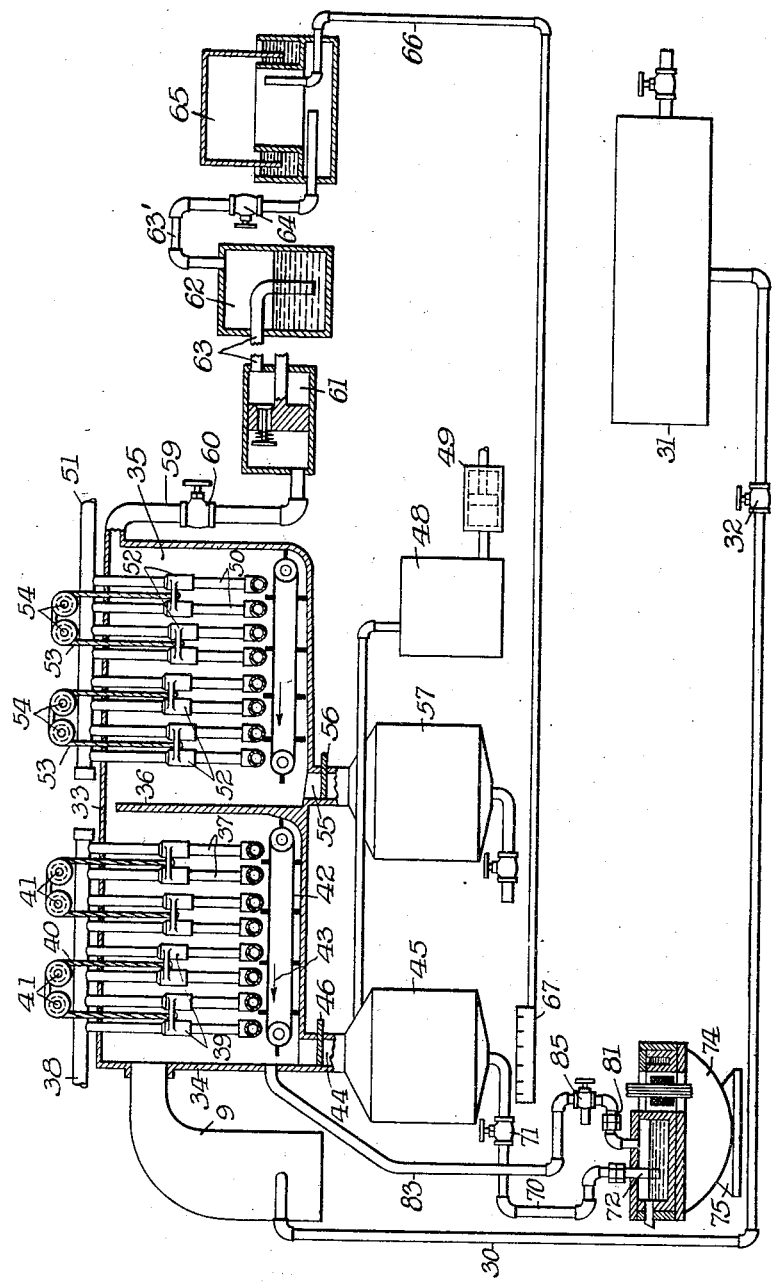
Figure 2:
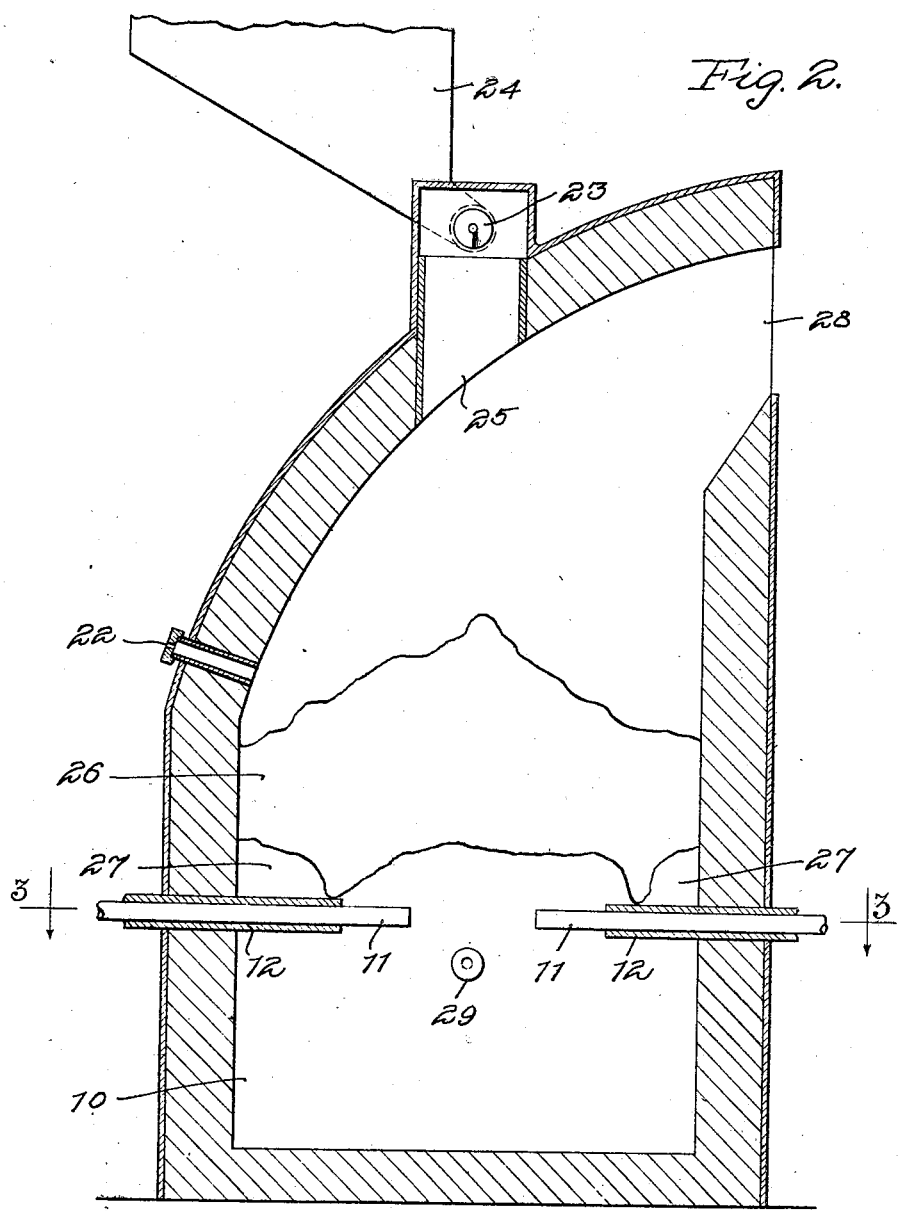
Figure 2 is a vertical sectional view of the chloridizing furnace.
Figure 3:
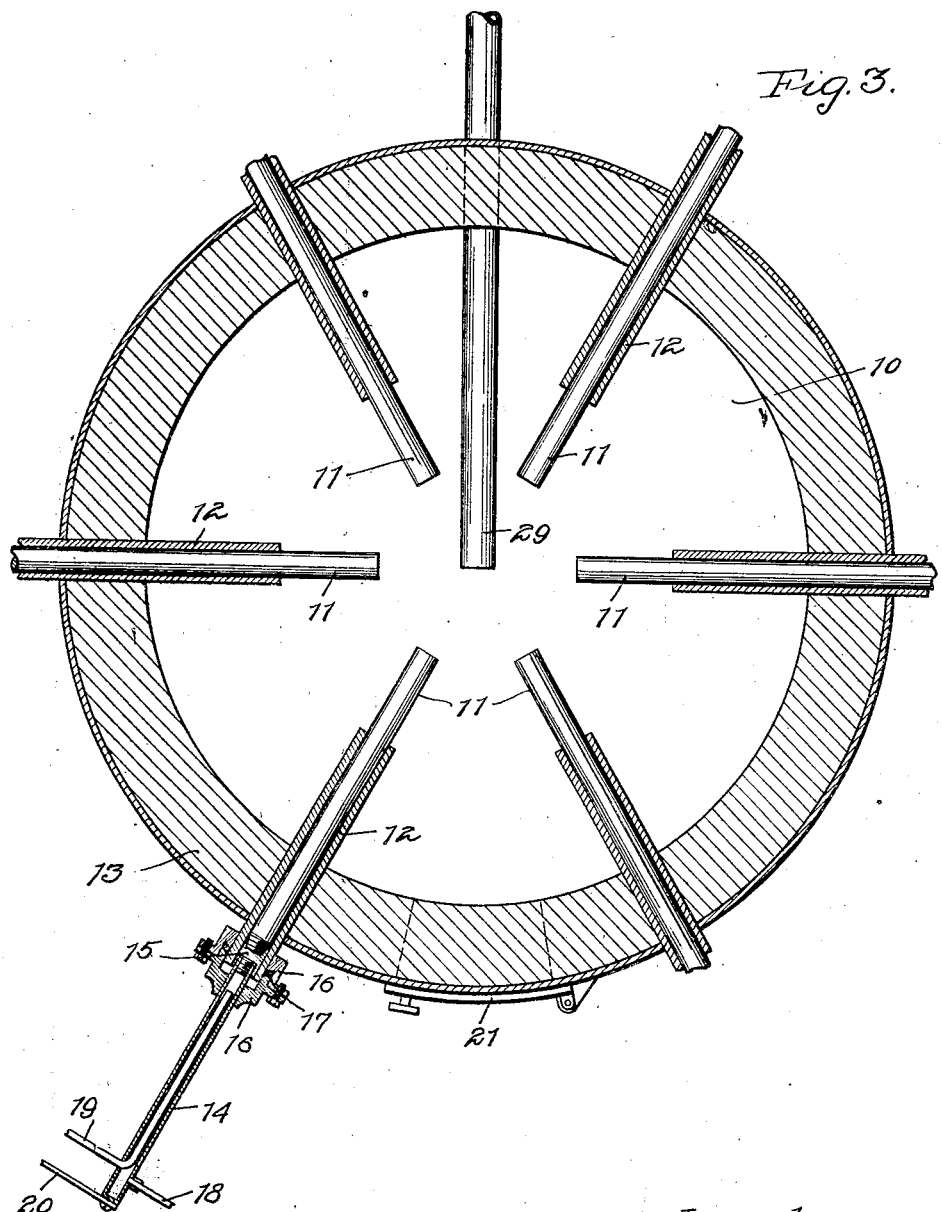
Figure 3 is a horizontal sectional view of the chloridizing furnace taken on the plane of the line 3—3 of Figure 2 and looking in the direction indicated by the arrows.

Referring first to Figure 1, it will be seen that the chloridizing furnace is shown at 9, and by reference to Figures 2 and 3 it will be seen that this chloridizing furnace is of the sealed type and provides for a bed of coke 10, in which a plurality of electrodes 11—11, extending inwardly through the circular housing, as illustrated in Figure 3, are lodged. Each of the carbon electrodes 11 is firmly mounted in a terra cotta pipe 12, which in turn is mounted in the fire brick housing 13. An electric conductor 14 is provided for each of the carbon electrodes and this conductor is in the form of a pipe which is connected with the electrode at 15 and which is supported in position by means of a union 16 packed at 17. The pipe 14 is kept cool by a flow of water introduced through the entry pipe 18, and, after circulation, passed through the return pipe 19. The usual insulated electric conductor 20 may be attached to the end of the pipe 14, as illustrated, and at this distance from the furnace housing the conductor and its insulation will not be injuriously affected by the heat. The reference character 21 indicates a clean-out door which may be provided, and a peep-hole arrangement 22 may also be provided.

The charge is introduced into the chloridizing furnace by way of a screw conveyor, indicated at 23, at the bottom of a hopper bin 24, this screw conveyor leading the charge to the passage 25, through which the charge may drop on to the bed of coke which has already been referred to.

The charge is indicated at 26 and the bed is preferably so arranged that the coke exposed in the middle is surrounded by packed clay, as illustrated at 27—27. The charge may be any clay, but I have found that the higher grades of clay, such as kaolin, of the formula $Al_4(SiO_4)_3$—(the moisture being driven therefrom) is especially desirable. It will be noted that the furnace has only the outlet 28 and it will be noted as this description proceeds that the entire system is sealed as this furnace is. It will be noted that a graphite pipe 29 extends through the fire brick housing of the furnace and terminates in the heart of the coke bed. This pipe 29 is fed through a pipe 30 (Figure 1) from a storage reservoir 31, the connection being controlled by a valve 32. It will now be noted that, with the chlorine properly fed to the graphite pipe and with the current properly applied to the electrodes, the activity of the chlorine gas and the heat immediately effects the disintegration of the kaolin, the formation of aluminum chloride and silicon tetrachloride, and, by the combination of the carbon and the oxygen liberated from the kaolin, the formation of carbon monoxide.

The reaction is as follows:

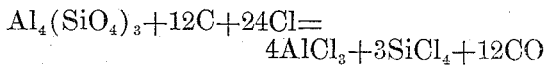
$$Al_4(SiO_4)_3 + 12C + 24Cl = 4AlCl_3 + 3SiCl_4 + 12CO$$

The three gases thus formed naturally rise and pass out of the outlet opening 28, and, as illustrated in Figure 1, are conducted to the condenser 33. This condenser is in the form of a double closed chamber providing the compartment 34 and the compartment 35 separated by a partition 36. The compartment 34 is provided with a system of cooling pipes 37—37, which extend downwardly through and from the top of the chamber and which are distributed throughout the entire space of this particular compartment in order to get complete temperature control. The pipes 37—37 are joined at the upper ends outside of the chamber by means of the header pipe 38, and circulation is secured in any desirable manner. In this particular condenser element the system of pipes is connected to a cold water supply and the result is that as the three gases which have been referred to enter and pass through the compartment 34 the aluminum chloride gas, which condenses at a higher temperature than the silicon tetrachloride gas, is condensed and deposits itself as a white powder upon the pipes 37—37. It might be mentioned here that it is possible that in the action in the chloridizing furnace some other chloride of silicon might incidentally be formed, a chloride such as hexachloride ($Si_2Cl_6$), but I find that conditions are such that it is only the silicon tetrachloride which plays any considerable part.

Since the temperature which is produced by the circulation of mere cold water in the cooling pipes 37—37 is not sufficiently low to condense silicon tetrachloride, this gas, together with the carbon monoxide, passes on to the next compartment 35 of the condenser. Thus the first condenser element 34 is devoted to the condensation of the aluminum chloride and the white powder to which it is reduced is removed from the pipes upon which it is deposited by means of the scrapers 39, 39, which, by means of pulley cords 40 passing over suitable pulleys 41, 41 on the outside of the condenser, are drawn up and down on the pipes to scrape them, in an obvious manner. The powder is thus thrown down on to the conveyor 42, the upper run of which passes in the direction of the arrow 43, and thus the condensed aluminum chloride is brought to the end of the condenser element where the outlet 44 leading to a tank 45 is provided. This outlet may be controlled by a valve 46. It will be noted that this tank is connected by means of a pipe with a compressed air tank 48, which is fed through the air compressor 49. It is important, as before indicated, that the system be a closed system and that various actions be carried on under pressure, and I speak of it particularly at this time because of the fact that the aluminum chloride to which I have just referred is extremely deliquescent and must be kept free from moisture in order to avoid decomposition and the formation of hydrochloric acid. When the system is closed, however, such a result is not possible, and the pressure is effective in condensing and keeping condensed this volatile substance.

Leaving the aluminum chloride, which has been deposited in the tank 45, for the present, I shall follow the course of the silicon tetrachloride gas and the carbon monoxide through the second element of the condenser. The condenser element 35 is provided with a system of cooling pipes 50 like the pipes 37, these pipes having the outside header 51 and being provided with the scrapers 52, 52 hung from the pulley cords 53, 53, passing over the pulleys 54, 54. Instead of being supplied with mere cold-water, however, the cooling pipes 50 are supplied with a freezing mixture of ice water and salt, and the temperature in the condenser element 35 is therefore considerably lower than the temperature in the condenser element 34. The lower temperature is sufficient to condense the silicon tetrachloride which comes down as a colorless liquid, except for any impurities which may discolor it. This liquid silicon tetrachloride passes down the sloping bottom of the condenser element 35 and passes through the outlet 55 to a tank 57. This outlet may be controlled by a valve 56. The condenser element 35 is provided with scrapers, as the condenser element 34 is, because it is possible that aluminum chloride not entirely condensed in its passage through the condenser element 34 may condense upon the pipes 50 of the condenser element 35, and it is therefore desirable to periodically operate the scrapers 52 in order to remove this condensation. The scrapers 39 of the other condenser element are operated during all the time that the system is being worked. The condenser element 35 is provided with a conveyor 58.

The carbon monoxide passes out of the condenser element 35 through a pipe 59, past a valve 60 and to a closed gas pump 61, and is then carried to a scrubber 62 by means of a pipe 63, this scrubber being in the form of a tank containing lime water and having an outlet pipe 63' leading therefrom. This outlet pipe is provided with a valve 64 and leads to a telescoping gas receiver 65 so that pressure may be kept upon the carbon monoxide which finds its way to this receiver and so that the carbon monoxide may be fed by way of a pipe 66 to a burner 67, which is used for heating the tank 45 for a purpose to which I shall now refer.

Where additional chlorides are formed in the chloridizing furnace, which condense at other temperatures, as is the case when iron or titanium are present in the clay, or other ore used, the condenser may be arranged to separate these from the aluminum and silicon chlorides, and from each other, by increasing the number of elements maintained at the different temperatures which are required to separately deposit the substances.

Returning now to the aluminum chloride deposited in the form of a powder in the tank 45 (this powder being white unless discolored by impurities), it will be noted that I have placed the burner 67 under this tank, and I may mention here that I surround the tank in practice with a suitable fire wall, so that I can subject the tank to a high degree of heat. With the valve 46 closed, the material in the tank 45 can be placed under high pressure from the tank 48, and this pressure together with the heat from the carbon monoxide burner melts the aluminum chloride, after which step the aluminum chloride is much more stable and much more easily handled, due to its physical condition. I desire to state, however, that it is entirely feasible to care for the aluminum chloride in its powder condition.

A pipe 70 leads from the tank 45 to a valve 71, which in turn is connected with a pipe 72 leading into a furnace, preferably of the Rodenhauser three-phase type. This furnace comprises a heavy outer housing, which is provided with a round bottom 74 mounted in a correspondingly shaped base 75, the idea being that when the connecting pipes are temporarily detached the furnace can be tilted in order to tap off molten metal, as will be pointed out a little later. The lining of the furnace provides a cavity for the molten metal. It will be seen that when the valve 71 is opened the liquid aluminum chloride is conducted to the working chamber of the Rodenhauser furnace. The reason for this step in the process is as follows:

In the first condensation of the aluminum chloride in the condenser element 34 there are likely to be impurities, principally iron chloride, unless more than two condenser elements are provided at appropriately different temperatures, and it is the object of the step in the process now under description to eliminate this iron and to secure pure aluminum chloride. Therefore, preliminarily, the Rodenhauser furnace is charged with aluminum and the molten bath, as illustrated, is formed, when, as before stated, the valve 71 is opened and the liquid aluminum chloride is fed into this bath of molten aluminum near the bottom thereof, the aluminum chloride is immediately reconverted into a gas due to the release of pressure and heat of bath and passes up through the molten aluminum. Due to the greater affinity of the chlorine for the aluminum than for the iron, or other impurity for that matter, the chlorine releases the iron and takes on the proper share of aluminum. The result is that the refined aluminum chloride will leave the bath of aluminum and will pass out of the furnace through the pipe 81 and pipe 83 back to the condenser, where it will be returned to its powder condition. The three-way valve 85 may be provided so that if desired the purified aluminum chloride may be led to a separate condenser, so that the first condenser may operate continuously and without the introduction of purified aluminum chloride gas. It will also appear that if some of the silicon tetrachloride should happen to become condensed in the aluminum chloride part of the condenser system, such condensed silicon tetrachloride will be removed with the impurities in the Rodenhauser furnace since the aluminum has greater affinity for chlorine than silicon and the chlorine will release the silicon and take up the proportionate share of aluminum, leaving the silicon to be tapped off with the impurities.

It will be seen that the system is a closed system and that moisture is effectively excluded so as to protect the active chlorides, particularly the aluminum chlorides.

It will appear that changes and modifications in the apparatus of my invention will be possible without departing from the spirit and scope of my invention and that parts of the apparatus may be advantageously employed without employing the other parts shown and described. I have already referred to the fact that the apparatus of my invention has much wider application than for carrying out merely the process which I have cited as an instance of use and it is to be understood that I contemplate any use to which my apparatus and the individual parts thereof may be put. I desire, therefore, that the metes and bounds of my invention shall be determined by the appended claims which I have drawn variously so as to bring out the combinations which, of themselves and regardless of their use, are new.

I claim:

1. In combination, a sealed furnace, a sealed condenser connected therewith and having a manually controlled outlet at the bottom and a valved outlet at the top, and a sealed tank having sealed connection with said manually controlled outlet.

2. In combination, a sealed furnace, a sealed condenser connected therewith, a sealed gas receiver having sealed connection with said condenser, a sealed tank connected with said condenser, and means for heating said tank.

3. In combination, a sealed furnace, a gas storage reservoir having sealed connection for feeding to said furnace, said furnace having an inlet adapted to be sealed by the material fed thereto, and a sealed condenser connected with said furnace, said condenser having a valved outlet.

4. In combination, a sealed furnace, a gas storage reservoir having sealed connection with said furnace, said furnace having an inlet adapted to be sealed by the material fed thereto, and a sealed condenser fed from said furnace, said condenser having an outlet to a pump.

5. In combination, a sealed furnace, a gas storage reservoir having sealed connection with said furnace, said furnace having an inlet adapted to be sealed by the material fed thereto, a sealed condenser connected with said furnace, said condenser having a connection to a pump, and a sealed receiver connected with said condenser.

6. In combination, a sealed furnace, a storage reservoir having sealed connection with said furnace, said furnace having an inlet adapted to be sealed by the material fed thereto, a sealed condenser connected with said furnace, said condenser having an outlet pipe leading to a pump, a sealed tank connected with said condenser, a scrubber to which said pump delivers, a gas receiver communicating with said scrubber, said receiver supplying a pressure feed to a burner, said burner being disposed in proximity to said tank.

7. Apparatus for forming and treating chlorides which comprises a closed system including in series a furnace, a condenser having an outlet leading to a pump, a gas scrubber, and a gas receiver, said condenser having an outlet into a closed tank, and a burner disposed in proximity to said closed tank.

8. Apparatus for forming and treating chlorides which comprises a closed system including in series a furnace, a condenser having a pump connection, a gas scrubber, a gas receiver, said condenser being divided into two compartments and provided with means for producing different temperatures in said two compartments, and a burner fed from said gas receiver being disposed in proximity to a sealed tank connected to said condenser.

9. In combination, a sealed furnace, a sealed condenser connected therewith, a sealed gas receiver having sealed connection with said condenser, a sealed tank connected with said condenser, means for heating said tank, and means for maintaining super-atmospheric pressure in said tank.

10. In combination, a sealed furnace, a gas storage reservoir having sealed connection therewith, said furnace having an inlet and means for sealing said inlet, and a sealed condenser connected with said furnace, said condenser having a valved outlet.

11. In combination, a sealed furnace, a sealed condenser, and a pump in series arrangement, said condenser having a valved outlet at the bottom thereof.

12. In combination, a combining chamber, a second chamber connected therewith, said second chamber having two portions, means for maintaining different temperatures respectively in said portions, and a collecting tank connected with each portion.

13. In combination, a sealed furnace, a sealed condenser connected therewith and having a manually controlled outlet and a connection to a pump, and a tank having normally sealed connection with said manually controlled outlet.

14. In combination, a sealed furnace, a gas storage reservoir having sealed connection for feeding to said furnace, said furnace having an inlet adapted to be sealed by the material fed thereto, and a condenser connected with said furnace.

15. In combination, a sealed furnace, a gas storage reservoir having sealed connection with said furnace, said furnace having an inlet adapted to be sealed by the material fed thereto, a sealed condenser connected with said furnace, a tank connected with said condenser, and a burner disposed in proximity to said tank.

16. Apparatus for forming and treating chlorides which comprises a closed system including a furnace, a condenser, a pump and a gas receiver connected in series, a sealed tank connected with an outlet from said condenser, and a burner disposed in proximity to said tank.

In witness whereof, I hereunto subscribe my name this first day of July, A. D. 1915.

VICTOR M. WEAVER.